Figure 1:
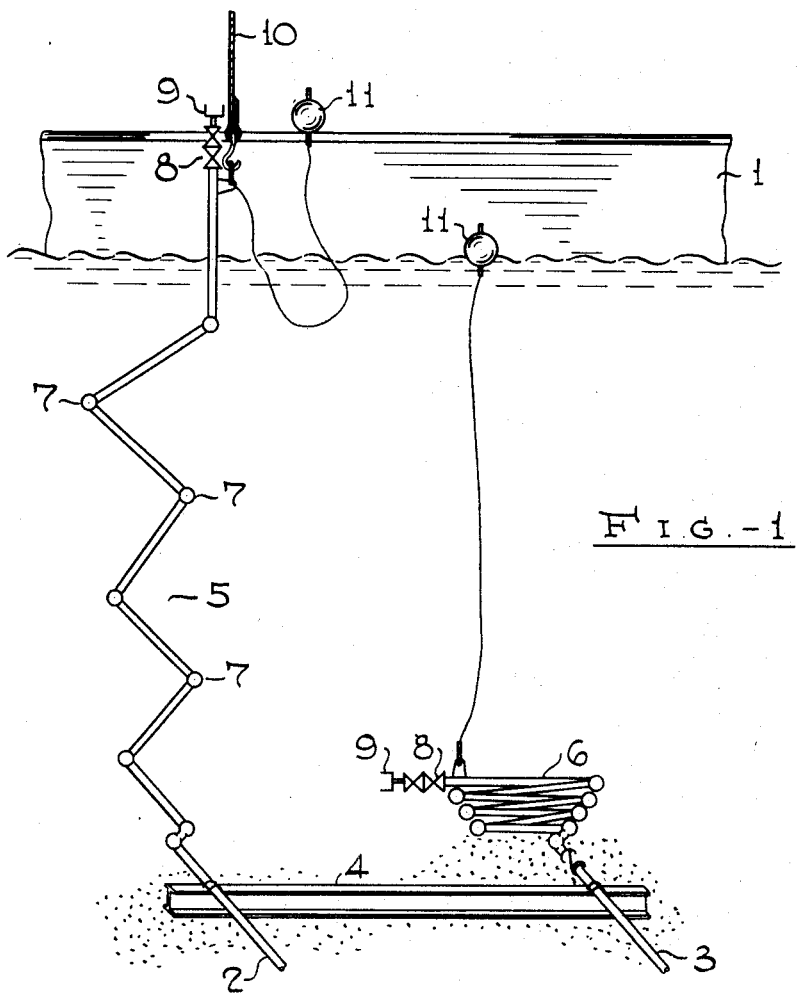

Aug. 11, 1953

F. G. MARANCIK ET AL 2,648,201

OFFSHORE SHIP UNLOADING FACILITIES
FOR HIGH-PRESSURE FLUIDS

Filed Sept. 2, 1949

2 Sheets-Sheet 1

Frank G. Marancik
John A. Laudenberger Inventors

By W.O. Heilman Attorney

Frank G. Marancik
John A. Laudenberger Inventors
By W.O. Hillman Attorneys

Patented Aug. 11, 1953

2,648,201

UNITED STATES PATENT OFFICE 2,648,201

OFFSHORE SHIP UNLOADING FACILITIES FOR HIGH-PRESSURE FLUIDS

Frank G. Marancik, Union, and John A. Laudenberger, Cranford, N. J., assignors to Standard Oil Development Company, a corporation of Delaware Application September 2, 1949, Serial No. 113,868

4 Claims. (Cl. 62—1)

1

This invention relates to novel and useful apparatus for permitting the transfer of high pressure fluids between a tankage vessel and shore installations. In accordance with this invention, fixed piping is provided at the bottom of a body of water from a point off shore to tanks or vessels on the shore. By utilization of a novel, accordion-like piping arrangement, connection to this piping may be made between a ship and the termination of the fixed piping beneath the surface of the water. Provision is made for a pressure equalizing line which permits the pumping of liquefied gases between the ship and the shore without difficulties that would otherwise be encountered.

Proposals have formerly been made for the offshore unloading of liquids from a ship in which connection is made between the ship and the shore by a single transfer line. The arrangements which have been used generally depended upon utilization of a flexible tube connected between the ship and a submarine line. It is the principal object of this invention to improve this general type of unloading technique by provisions adapting it for utilization with high pressure liquefied, normally gaseous, products and by provisions enabling use of all metal construction.

In order to attain these objectives, sunken lines may be positioned extending from and desired point off shore to suitable shore installations. As will be disclosed, it is essential for transfer of high pressure products that two submarine lines rather than one be provided. A novel feature of this system in accordance with this invention is the provision of swivel-connected sections of pipe which are permanently fixed to the offshore terminations of the two submarine lines. The swivel-connected sections of pipe are of such a nature as to permit of an accordion-like extension or collapse of the piping. Consequently, when the facilities are not in use, the accordion-like sections of the pipe may be dropped to the ocean floor to be retrieved when the system is to be employed. For this purpose, marking buoys may be attached to the ends of the accordion sections of pipe carrying suitable cables to permit raising the pipe when required. A further characteristic of this type of piping arrangement is that when in use, the degree of freedom permitted by the accordion-like pipe sections eliminates any difficulties due to movement of the vessel to be unloaded.

The apparatus of this invention is of particular application to the ship to shore transfer of products such as liquefied propane gas. In this specific example, the gas is ordinarily maintained at pressures of about 250 lbs. per square inch or greater. Such a high-pressure fluid can not be transferred from ship to shore through a single line without encountering difficulties due to the displacement of vapor in the transfer line and in receiving tanks. If no provision were made for venting this vapor, then it would be necessary to supply sufficient pumping pressure to permit the compression of all vapor in the system. Alternatively, if a vent were employed, a certain amount of propane would be lost through the vent, creating safety hazards. Consequently, it is highly desirable in such an application that suitable provision be made for the return of displaced vapor from the tank being filled to the tank being emptied. In this manner a completely closed circuit may be used with consequent advantages. In its most specific adaptation therefore, this invention provides a liquefied gas transfer line in combination with a vapor return line.

The nature of this invention may be fully understood by reference to the accompanying drawings in which is diagrammatically represented one embodiment of this invention.

In these drawings:

Figure 1 diagrammatically represents the submarine transfer lines of this invention in relation to an offshore ship.

Figure 2:
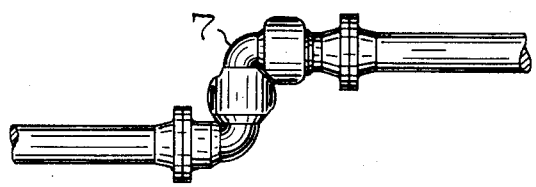
Figure 3:
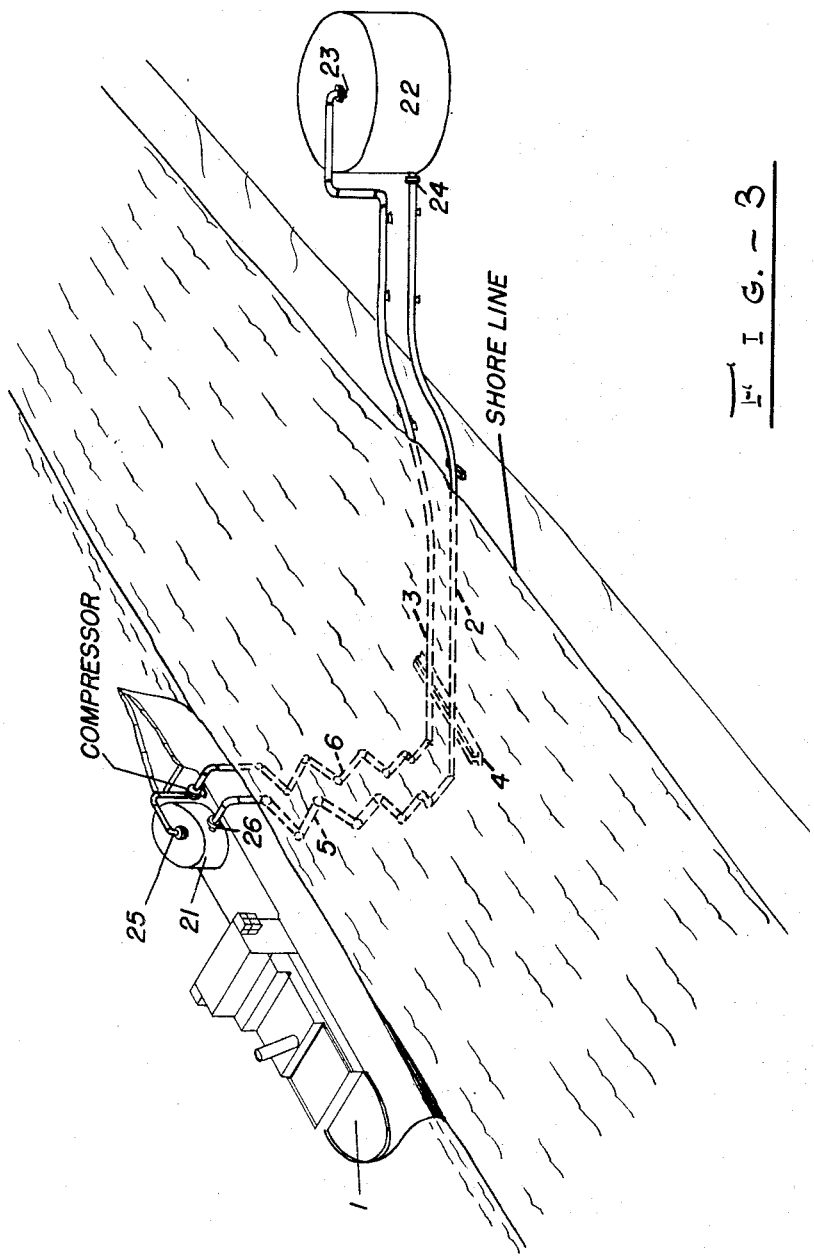

Figure 2 is a detail drawing showing the construction and nature of the swivel connections to be employed; and Figure 3 is a diagrammatic view showing the overall relationship of all of the elements of the offshore unloading facilities of this invention.

Referring to the drawings, the numeral 1 designates a vessel or ship which is fragmentally illustrated. This vessel is illustrated as being positioned some distance off shore, as, for example, a distance of about one half mile to a mile. It is assumed that no piers or dock facilities are available or that such facilities are to be dispensed with so that the apparatus of this invention may be employed to transfer liquefied gaseous products to or from the ship from a point offshore. In order to accomplish this object, according to this invention, two submarine transfer lines 2 and 3 are permanently located on the bottom of the bed of water extending from any desired point off shore to storage tanks or tank car loading facilities on the shore. Thus, lines 2 and 3 may be permanently fixed to the shore bottom by means of suitable anchors or ballast 4, extending outwardly from the shore for any desired distance. These lines may best consist of extra heavy piping permanently anchored to or fixed to the ocean bottom. While the separation of the lines at the shore ends is not critical, it is preferred that at their termination off shore, they be separated by a substantial distance such as, for example, about 30 ft. In order to connect the two submarine lines 2 and 3 to the storage tanks of the vessel 1, swivel-connected pipe sections 5 and 6 are provided. Each of the swivel pipe sections is made up of a number of comparatively short sections of straight piping which are connected together by conventional high pressure swivel connections 7. It is particularly preferred that the sections of pipe connected in this manner differ in length so that complete collapse of the piping may be achieved without any substantial interference due to the joints of the piping. In order to fabricate the accordion-like sections of piping, conventional swivel joints may be employed of such a character as to permit swiveling in either two or three directions. Thus, as illustrated in Figure 2, each of the connections of the collapsible piping may consist of two-way swivels 7 which may be welded or connected by suitable flanges to the short sections of pipe. Suitable two or three way swivels of this nature are commercially available. For submerged use in accordance with this invention, it is particularly desirable to employ the type having a lubricating agent sealed in the swivel. Each of the ends of the accordion-like sections of piping are preferably equipped with two valves 8 and a coupling member 9 to which a cap may be fixed when the piping is not in use or to which connection may be made to piping associated with the storage tank of the vessel to be unloaded. Thus, when in use, one section of the pipe is connected to a valved line connecting to a liquid discharge opening in the lower portion of the storage tank of the vessel. Similarly, the other of the two sections of pipe may be connected to a valved line extending to the upper portion of the storage vessel of the ship. The submarine lines and the swivel-connected sections of pipe are preferably painted or coated or subjected to cathodic protection to eliminate corrosion difficulties.

When the system which has been described is employed, one of the two submarine lines 2 is suitably connected with a liquid inlet 24 in the shore tank 22 to be loaded. The other of the two submarine lines 3 is suitably connected to an inlet 23 in the same tank positioned in the upper portion of the tank so as to be adapted for the removal of vapors from the tank. Consequently, when pumping liquid from the vessel to the shore, vapor displaced from the transfer line and from the tank being loaded will simply be forced back to the tank on the vessel.

When the unloading operation has been completed, the collapsible piping 5 and 6 may be disconnected and each of the accordion-like sections of pipe may be lowered to the ocean bottom by means of a suitable derrick or lifting arrangement 10 provided on the ship. The cables used for lowering the accordion-like sections of the piping may conveniently be used to anchor buoys 11 marking the location of the sunken pipes. Consequently, when again necessary to utilize this unloading system, the accordion-like sections of piping may be pulled upwardly to the surface for connection with the ship. It is apparent that the nature of the swivel-connected sections of pipe permit loading and unloading operations to continue regardless of normal shifting and moving of the vessel being unloaded.

As described, the offshore transfer facilities of this invention provide a closed piping circuit between the tanks of a ship and tanks on the shore. One of two transfer lines connects to the lower or liquid spaces of the two tanks while the other of the two transfer lines connects to the upper or vapor spaces of the two tanks. To force the liquid and vapor through these lines a pump may be positioned in the liquid leg of this arrangement. However this is not desirable as the pump must be positioned below the tank being unloaded so as to have sufficient liquid head to operate. It is a particular feature of this system therefore to avoid use of a pump by positioning a compressor in the vapor leg of the transfer arrangement. Thus if desired, a compressor may be positioned on the deck of the ship connected in the vapor transfer line. A further advantage of this arrangement is that after liquid has been discharged from the tank being unloaded, the liquid outlet of the tank may be closed, and by reversing the compressor, the vapors present in the tank may be forced into the tank being loaded.

A further refinement of the apparatus described relates to the method used to connect the couplings 9 to the tank on the vessel. For this purpose it is preferable to employ an arrangement of swivel connected piping similar to the sections 5 and 6. This permits sufficient freedom in the movement and arrangement of the piping so that connection to the coupling 9 may be made at a point along side of the vessel. For this purpose it is preferable to utilize two or more three-way swivels in the piping connecting the tank to the coupling 9. By virtue of this arrangement, any leakage of liquid while coupling connections are being made or while the tanks are being discharged will simply result in the liquid dropping into the water alongside the vessel.

What is claimed is:

1. Apparatus for the offshore loading and unloading of a high pressure fluid product consisting of swivel-connected sections of pipe extending between a fluid discharge from the ship's tank to the termination of a fixed submarine line, said submarine line extending to shore tankage facilitities forming a liquid leg of the system, a return submarine line extending from a vapor outlet from said shore tankage facilities to a point adjacent the termination of the first submarine line and swivel connected sections of piping connecting the said second submarine line to the vapor space of the said ship's tank forming a vapor leg of the system, and a compressor positioned in the vapor leg of the system, said swivel-connected sections of piping being adapted for disengagement and lowering to the bottom of a bed of water when not in use.

2. Apparatus for the offshore loading and unloading of a high pressure fluid product consisting of swivel-connected sections of pipe extending between a fluid discharge from the ship's tank to the termination of a fixed submarine line, said submarine line extending to shore tankage facilities, a return submarine line extending from a vapor outlet from the said shore tankage facilities to a point adjacent the termination of the first submarine line and swivel-connected sections of piping connecting the said second submarine line to the vapor space of the said ship's tank, said swivel-connected sections of piping being adapted for disengagement and lowering to the bottom of a bed of water when not in use.

3. Apparatus defined by claim 2 in which said swivel connected sections of pipe are of differing lengths whereby accordion-like collapse without interference of swivel joints can occur.

4. Apparatus defined by claim 2 in which said terminations of the said first and second submarine lines are anchored.

FRANK G. MARANCIK.
JOHN A. LAUDENBERGER.

References Cited in the file of this patent

UNITED STATES PATENTS

| Number | Name | Date |
|---|---|---|
| 544,460 | Collins et al. | Aug. 13, 1895 |
| 729,992 | Baker | June 2, 1903 |
| 1,864,816 | Hamer | June 28, 1932 |
| 1,894,390 | Banks | Jan. 17, 1933 |
| 2,257,897 | Zenner et al. | Oct. 7, 1941 |
| 2,502,525 | Krugler | Apr. 4, 1950 |